March 23, 1965  E. J. WEBER  3,174,535
IGNITION SYSTEM FOR GAS BURNERS
Filed April 9, 1962

INVENTOR:
EARL J. WEBER
BY Howson & Howson
ATTYS.

Patented Mar. 23, 1965

3,174,535
IGNITION SYSTEM FOR GAS BURNERS
Earl J. Weber, Bay Village, Ohio, assignor to American Gas Association, Incorporated, New York, N.Y., a corporation of New York
Filed Apr. 9, 1962, Ser. No. 186,181
2 Claims. (Cl. 158—125)

This invention relates to an ignition system for gas burners, especially to a self-contained ignition system of the "cold" type wherein during the off period there is no consumption of energy and no flame, not even a pilot flame; which requires no outside energy; and which continuously maintains itself in operating condition as to energy supply; and has for an object the provision of improvements in this art.

The present invention relates to an ignition system for gas burners of the general type described in my copending application Serial No. 182,279, filed March 26, 1962. In that application a capacitor is used to time out the igniting action if a flame has not been established within a predetermined time; also a battery is used for initially supplying power for opening the main burner valve and means are provided for furnishing substitute power and shifting from battery to the substitute power means when heat is generated at the burner; also means are provided for charging the battery by energy derived from the burner.

According to the present invention the main burner valve is not operated by the battery at all. Instead, the battery is used only to operate a pilot burner valve and as soon as that generates heat the battery is charged by energy derived from the burner. And, whereas in the other case the pilot burner was maintained in operation for only a short time at the start of a cycle, in the present case the pilot burner is kept in operation throughout the time that the main burner is kept in operation, adding its heat to that of the main burner.

Figure 2:
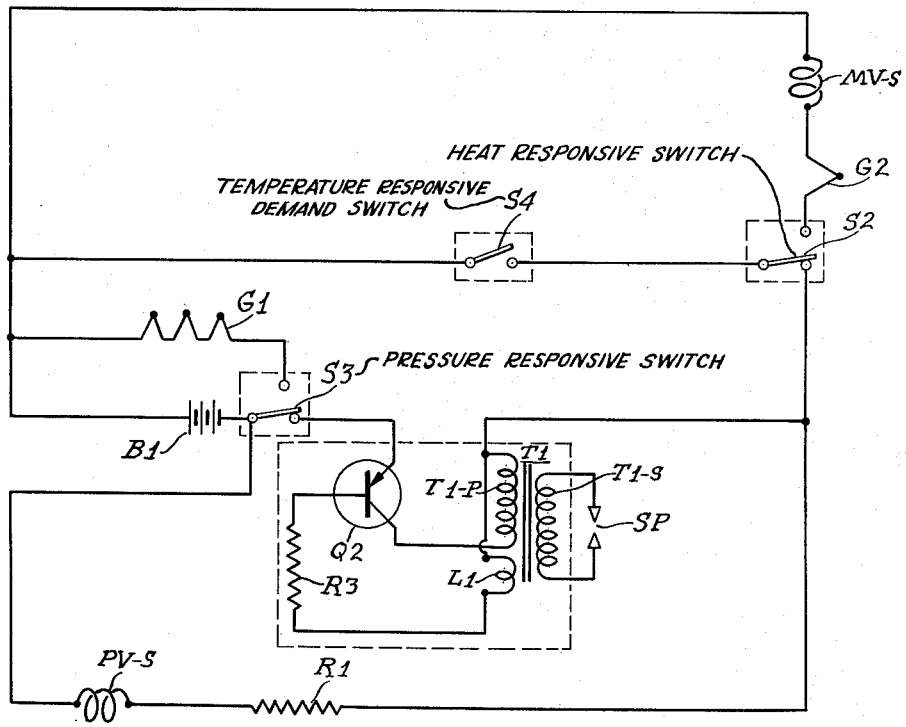
Figure 1:
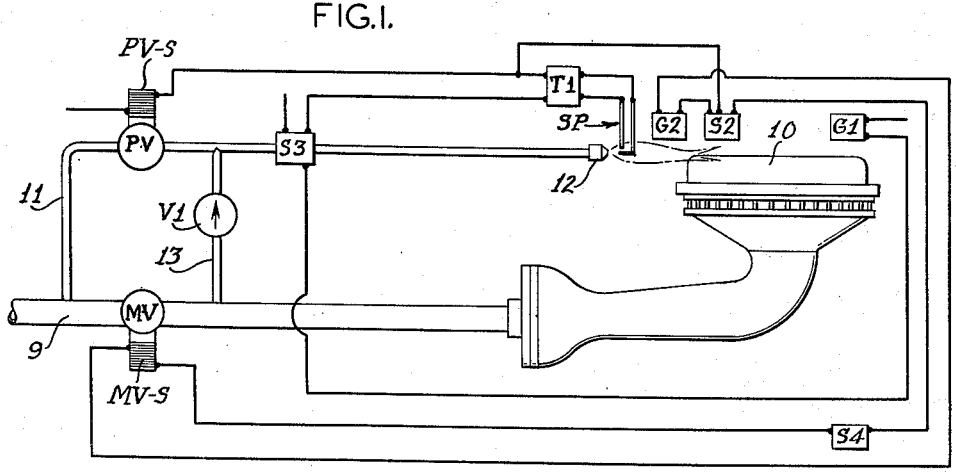

The objects of the invention as well as various features of novelty and advantages will be apparent from the following description of an exemplary embodiment, reference being made to the accompanying drawings, wherein:

FIG. 1 is a semi-diagrammatic view of the burner and ignition system embodying the invention; and FIG. 2 is a wiring diagram.

The system has been designed for a small space heater but it can be applied to any automatic ignition gas heating system. The term gas heating includes any air mixed fuel burner system but a conventional type gas burner is specifically referred to herein for purposes of illustration.

As shown herein, a main gas burner 10 is supplied with gas by way of a pipe 9 having a main gas valve MV which is controlled by electrical means such as a solenoid MV–S. A pipe line 11 supplies gas to a pilot burner 12 of the jet or flame thrower type, the flow being controlled by a valve PV operated by a solenoid PV–S.

The pilot burner fuel is ignited by a spark device or spark plug igniter SP (a model airplane spark ignition system will serve to operate the igniter), the spark plug being located in the path of the pilot burner gas jet. The spark device SP is energized for the short time necessary by a battery B1 connected initially to the ignition circuit by a pressure switch S3. The switch S3 is responsive to gas pressure in the pilot burner line 11 and as soon as the pressure rises to full value the switch S3 shifts over to connect the battery to a burner-heat-energized thermopile battery-charging generator G1.

A temperature responsive demand switch S4 closes when heat is required and this starts a cycle of operation. At first the current from the battery B1 flows to the pilot valve solenoid PV–S by way of a single pole double throw heat-shifted switch S2 but as soon as heat is established at the burner the switch S2 shifts contacts to de-energize the pilot valve solenoid PV–S, a resistance R1 aiding in the drop-out action of PV–S; and operation of switch S2 also places the solenoid MV–S of the main burner valve MV in a circuit with a burner-heat-energized generator G2. The generator G2 needs to be fully energized before the switch S2 changes position in order to avoid false action. After G2 acts on MV–S to open the main burner valve MV it holds it open for the remainder of the cycle.

As soon as the pilot valve solenoid PV–S is de-energized the pilot valve PV closes but a one-way by-pass pipe line 13 is provided between the main burner pipe line 9 and the pilot burner pipe line 11 beyond the pilot burner valve PV (i.e., nearer to the pilot burner), a one-way check valve V1 being provided in the by-pass line, to continue to supply gas to the pilot burner when the main burner valve MV is opened. This also keeps the pressure-operated switch S3 closed between the battery B1 and its charging generator G1. Continuity of supply of gas to the pilot burner during the latter process is assured by the inherently quick switch-over action of the conventional heat-shifted switch S2, which permits the main valve MV to begin to open before the pilot valve PV is completely closed; and by the inherent persistence, typically for several seconds in a conventional pilot burner, of the pilot burner flame after the supply of gas thereto is greatly reduced or even shut off completely.

Referring specifically to the wiring diagram, FIG. 2, the igniter or spark plug SP is supplied with current by the secondary T1–S of a transformer or spark coil device T1 having a primary coil T1–P supplied with current power from the battery B1 when the switch S3 is in its no-pressure position.

The spark is generated at gap SP through the use of a high frequency oscillator including transistor Q2, the oscillator being supplied with power by battery B1. High frequency oscillations are supplied to the spark gap through transformer T1 having a primary T1–P coupled to the transistor output, a secondary T1–S coupled to the spark gap and a feed-back coil L1 coupled back to the base of the transistor through resistor R3.

In operation, the pilot valve PV is opened and the igniter SP is set into action when the demand thermostat S4 is closed. When pressure in the pilot burner line 11 reaches the point to shift pressure switch S3 the igniter SP will be de-activated and the battery will be connected with the generator G1 for charging the battery. The pilot burner will have been ignited by this time and the pilot burner flame will heat the generator G2 and the heat-actuated switch S2. It is arranged that the generator G2 will be heated sufficiently to operate the main burner valve MV–S when the switch S2 shifts position.

When the generator G2 operates the solenoid MV–S to open the valve MV the pilot burner flame will ignite the gas flowing from the main burner.

The pilot valve solenoid PV–S is cut off from the battery when the heat switch S2 shifts over so that all the load is taken off the battery and the battery is put on charge by the generator G1, this being heated by the flame of the main burner.

The system fails safe because the pilot burner flame, if not ignited, will not heat the switch S2 and the main gas valve MV will not be opened. In the rare event that neither the pilot burner nor consequently the main burner are ignited, the battery will keep the pilot valve PV open until the battery discharges. The pressure switch S3 will keep the ignition system from being connected to the battery.

The battery may be a small rechargeable nickel-cadmium unit of known type, with an output voltage of about 2.4 volts, although a voltage as low as 1.2 volts has been used successfully.

It is thus seen that the invention provides a simple, self-powered, self-contained, reliable, inexpensive and easily serviced system for igniting a gas burner.

While one embodiment of the invention has been described for purposes of illustration, it will be apparent that there may be various embodiments and modifications within the general scope of the invention.

I claim:
1. An ignition system for a gas burner, comprising:
a pilot gas burner;
an electrically operable pilot gas supply valve for said pilot gas burner having electrical actuating means;
a main gas burner;
an electrically operable main gas supply valve for said main gas burner having electrical actuating means;
a low-storage-capacity rechargeable battery;
an electrical igniter means for said pilot gas burner operative in response to supply voltage applied thereto from both terminals of said battery;
a first burner-heat-energizable electrical generator means positioned to be energized by heat from at least one of said main gas burner and said pilot gas burner;
first gas-pressure-responsive electrical switch means having first, second and third contact elements, said first contact element being connected to said second contact element in the absence of gas pressure supplied to said first switch means, said first switch means being operable in response to gas pressure supplied thereto to connect said first contact element to said third contact element;
means connecting one terminal of said battery to said first contact element;
means connecting said first generator means between the opposite terminal of said battery and said third contact element;
second burner-heat-operable switch means positioned to be heated by said pilot burner and comprising a first contact element, a second contact element and a third contact element, said second switch means when cold connecting said first contact element to said second contact element, said second switch means being responsive to heating by said pilot burner to connect said first contact element to said third contact element;
means connecting said opposite battery terminal to said first contact element of said second switch means;
means operatively connecting said one battery terminal and said second contact element of said second switch means to said electrical actuating means of said pilot gas supply valve for actuating it when said second switch means is cold and for deactuating it when said second switch means is heated;
means for supplying said first switch means with gas under pressure by way of said pilot gas supply valve when said last-named valve is open;
means operatively connecting said igniter means between said second contact element of said first switch means and said second contact element of said second switch means, for actuating said igniter means when said second switch means is cold and when said pilot valve is open;
a second generator means;
means connecting said second generator means and said electrical actuating means of said main gas supply valve in series between said opposite battery terminal and said third contact element of said second switch means, for opening said main gas supply valve in response to current from said second generator means when said second switch means has been heated; and
means supplied with gas pressure by way of said main gas supply valve for operating said first switch means and for supplying gas to said pilot gas burner when said pilot gas supply valve is closed and said main gas supply valve open.

2. The system of claim 1, in which said first generator means is positioned beyond the heating zone of said pilot gas burner and so as to be heated by said main gas burner.

References Cited by the Examiner
UNITED STATES PATENTS

| | | | |
|---|---|---|---|
| 1,253,201 | 1/18 | Auel | 158—131 X |
| 2,041,014 | 5/36 | Norton | 158—28 |
| 2,125,473 | 8/38 | Vaughan | 158—126 |
| 2,305,242 | 12/42 | English | 126—110 |
| 2,362,259 | 11/44 | Findley | 158—125 X |
| 2,411,230 | 11/46 | Ray | 158—124 |
| 2,444,239 | 6/48 | Aubert et al. | 158—28 |
| 2,456,147 | 12/48 | Ray | 158—124 |
| 2,950,754 | 8/60 | Bertie et al. | 158—125 |

FOREIGN PATENTS

| | | |
|---|---|---|
| 553,087 | 12/56 | Belgium. |
| 559,785 | 10/57 | Belgium. |

JAMES W. WESTHAVER, *Primary Examiner.*

FREDERICK L. MATTESON, Jr., MEYER PERLIN,
*Examiners.*